(12) United States Patent
Peng et al.

(10) Patent No.: US 7,246,952 B2
(45) Date of Patent: Jul. 24, 2007

(54) LIGHT-GUIDE FIXING EQUIPMENT

(75) Inventors: Chi-Tsung Peng, Hsinchu (TW); Wen-Chung Yen, Hsinchu (TW)

(73) Assignee: Baycom Opto-Electronics Technology Co., Ltd. (TW)

( * ) Notice: Subject to any disclaimer, the term of this patent is extended or adjusted under 35 U.S.C. 154(b) by 0 days.

(21) Appl. No.: 11/042,152

(22) Filed: Jan. 26, 2005

(65) Prior Publication Data

US 2006/0165367 A1    Jul. 27, 2006

(51) Int. Cl.
    *G02B 6/42* (2006.01)
    *G02B 6/35* (2006.01)
(52) U.S. Cl. .......................................... 385/92; 385/89
(58) Field of Classification Search ...................... None
    See application file for complete search history.

(56) References Cited

U.S. PATENT DOCUMENTS 5,577,146 A * 11/1996 Musk ........................... 385/92
6,377,743 B1 * 4/2002 Ueda et al. .................. 385/137

* cited by examiner

*Primary Examiner*—Michelle Connelly-Cushwa
*Assistant Examiner*—Jerry T Rahll
(74) *Attorney, Agent, or Firm*—Lowe, Hauptman & Berner LLC

(57) ABSTRACT

A light-guide fixing equipment is described, suitable for assembling a light source and a hank of optical fibers of an optical fiber illuminant device. The light-guide fixing equipment comprises an assembling device and a fixing device. The assembling device is constituted by inserting a first casing into a second casing, in which the assembling device includes two openings respectively located in a portion of two end surfaces of the assembling device, and a plurality of locked parts are set and protrude on inner walls of the first casing and the second casing according to the shape of the light source and the hank of the optical fibers. With the other portion of the end surfaces of the assembling device and the locked parts, the source and the hank of the optical fibers can be assembled and fixed within the assembling device. The fixing device is a hollow housing located on an outer wall of the assembling device, in which the fixing device can engage with the assembling device, so as to fix the assembling device.

19 Claims, 4 Drawing Sheets

LIGHT-GUIDE FIXING EQUIPMENT

FIELD OF THE INVENTION

The present invention relates to a light-guide fixing equipment, and more particularly, to a light-guide fixing equipment of an optical fiber illuminant device.

BACKGROUND OF THE INVENTION

Presently, optical fiber can be mainly divided into two sorts: glass optical fiber and plastic optical fiber. Compared to glass optical fiber, plastic optical fiber has advantages including being flexible but tough, easily mass-produced, inexpensive, convenient to use and light-guiding even when flexed significantly. Optical fiber is primarily used to communicate signals; however, the communicating loss rate of the plastic optical fiber is greater and side light leaking is more serious than for glass optical fiber, so plastic optical fiber has been given to other uses. For example, the light-guiding property of plastic optical fiber can be applied in a visual or monitor lighting device; or the lighting effect of the side light leaking of the plastic optical fiber can be applied in lighting and adorning of objects or staircases, or in optical fiber textiles, in which a portion of the optical fiber cover layer is removed to form a plurality of pits that reach the core of the fiber, and with these pits, the incident light in the fiber leaks from the side wall resulting in a lighting effect.

Typically, the textile or the adornment, in which the light is guided by the optical fiber, has a small illuminant device to provide light. The small illuminant device is mainly composed of optical fibers and a light source. In the assembling, the ends of the optical fibers must be gathered into a hank, and at least one light source and a power supply are set in the rear side of the ends of the optical fibers, in which the light source can be a light-emitting diode (LED), and the power supply can be a cell set or other direct current supply. The light beam emitted from the light source enters the end of the optical fiber hank, and the light is transmitted through the optical fibers. The optical fiber textile or adornment can shine by means of the side light leaking of the optical fiber.

Conventionally, in order to fix the locations of the optical fiber hank and the light source, a heat shrinkable tubing is used to wrap the light source and the optical fiber hank. However, some disadvantages and issues are raised in using the heat shrinkable tubing to fix the optical fiber hank and the light source. The most serious disadvantage is that when the heat shrinkable tubing is excessively shrunk due to improper temperature control during the shrinking process, the projecting angle of the light source is affected and a portion of the light emitted from the light source is blocked from projecting into the illuminant device, such as the optical fiber hank, thereby deteriorating the luminescence of the illuminant device. Furthermore, because the heat shrinkable tubing is made of a soft and plastic material, when an external force is applied to pull the optical fiber hank or the electric wire of the light source, the optical fiber hank or the light source detaches from the heat shrinkable tubing, thereby resulting in a poor fixing effect. In addition, because the heat shrinkable tubing closely adheres to the optical fiber hank and the light source along the shapes thereof, and the shape of the heat shrinkable tubing is indefinite, the shape of the heat shrinkable tubing cannot be designed and modeled according to the actual requirements, causing difficulty in overall application design.

SUMMARY OF THE INVENTION

Therefore, one objective of the present invention is to provide a light-guide fixing equipment, which can control the projecting angle of a light source accurately to make the light emitted by the light source completely project into an illuminant device, and thereby effectively enhance the luminescence of the illuminant device.

Another objective of the present invention is to provide a light-guide fixing equipment, which includes an assembling device and a fixing device. When the light-guide fixing equipment is applied, a hank of optical fibers and a light source are suitably put into the assembling device, and then the fixing device is put around and engaged with the assembling device, thus preventing the light-guide fixing equipment from detaching due to an external force. Therefore, the light-guide fixing equipment has excellent fixing effect.

Still another objective of the present invention is to provide a light-guide fixing equipment, in which an assembling device and a fixing device with different shapes and colors can be provided according to the application needs and the shape of the light source, so the light-guide fixing equipment has a beautiful appearance for a wide variety of applications.

According to the aforementioned objectives, the present invention provides a light-guide fixing equipment, suitable for assembling a light source and a hank of optical fibers of an optical fiber illuminant device, wherein the light-guide fixing equipment comprises an assembling device, which is constituted by inserting a first casing into a second casing, wherein the assembling device includes two openings respectively located in a portion of two end surfaces of the assembling device, a plurality of locked parts are set and protrude on inner walls of the first casing and the second casing according to the shape of the light source and the hank of the optical fibers, and with the other portion of the end surfaces of the assembling device and the locked parts, the light source and the hank of the optical fibers can be assembled and fixed within the assembling device; and a fixing device, which is a hollow housing, wherein the fixed device can engage with an outer wall of the assembling device, so as to fix the assembling device.

According to a preferred embodiment of the present invention, both the assembling device and the fixing device are made of heat-resistant and hard plastics and are hollow tapered bodies.

The assembling device can accurately control the relative location between the hank of the optical fibers and the light source, assemble the hank of the optical fibers and the light source precisely, and fix the hank of the optical fibers and the light source to avoid detachment by an external force. Furthermore, the fixing device can be put around and engaged with the assembling device, thus effectively fixing the assembling device. Therefore, with the application of the present invention, the fixing effect can be greatly enhanced, and the projecting angle of the light source can be maintained accurately to make the light emitted from the light source completely project into the optical fiber hank, thereby achieving the purpose of increasing the luminescence effect.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a light-guide fixing equipment, which can effectively fix a light source and a hank of optical fibers of an optical fiber illuminant device to prevent detachment caused by an external force and can maintain the projecting angle of the light source to achieve the purpose of enhancing the light-guiding effect. In order to make the illustration of the present invention more explicit and complete, the following description is stated with reference to FIGS. 1-3.

Figure 1A:
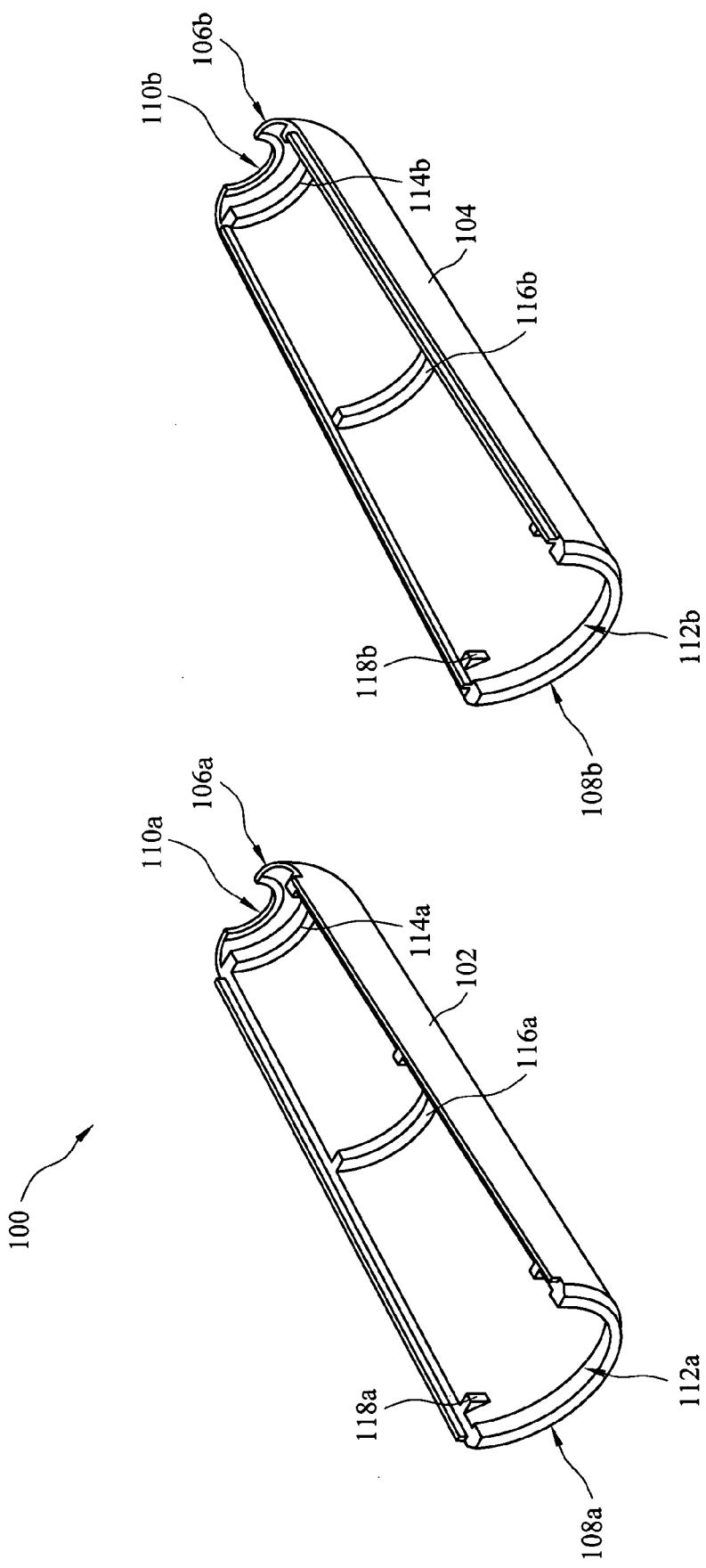
FIG. 1a is a three-dimensional schematic diagram of two casings of an assembling device in accordance with a preferred embodiment of the present invention.
Figure 1B:
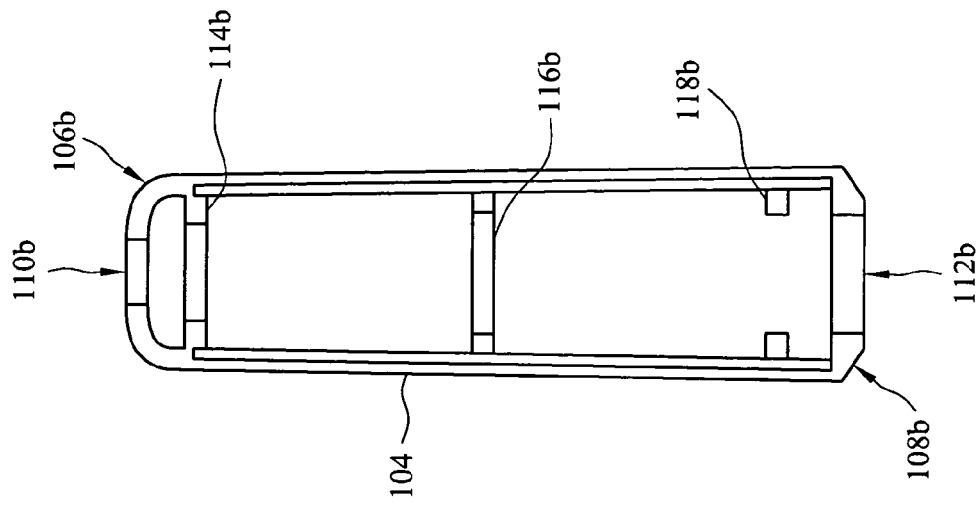
FIG. 1b is a top view of two casings of an assembling device in accordance with a preferred embodiment of the present invention.
Figure 1B:
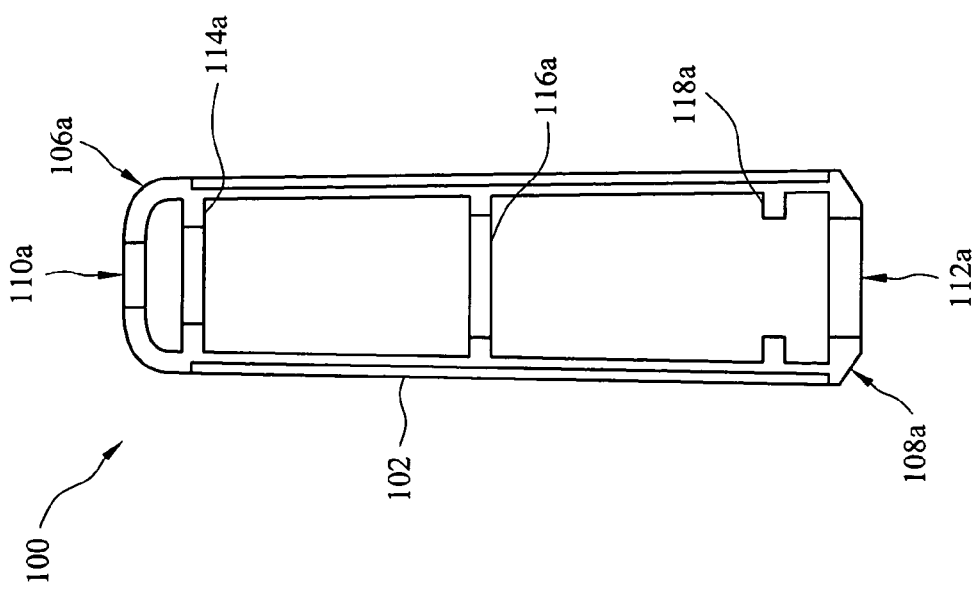
Figure 3:
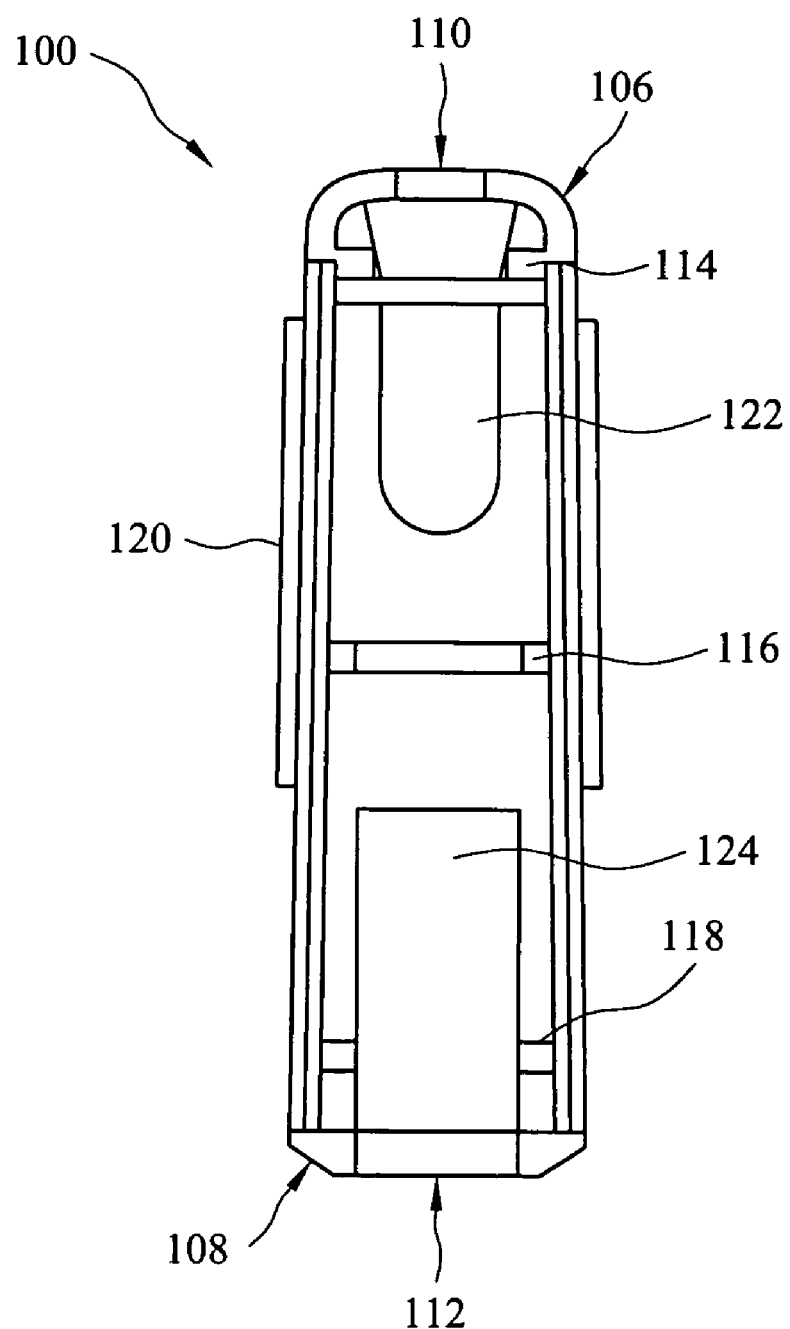
FIG. 3 is a schematic diagram of a light-guide fixing equipment in accordance with a preferred embodiment of the present invention.

Referring to FIGS. 1a and 1b, FIG. 1a is a three-dimensional schematic diagram of two casings of an assembling device in accordance with a preferred embodiment of the present invention, and FIG. 1b is a top view of the casings in FIG. 1a. An assembling device 100 is mainly composed of a casing 102 and a casing 104, and is constituted by inserting the casing 102 into the casing 104. According to the shapes of the light source and the optical fiber hank desired to be assembled, a locked part 114a and the corresponding locked part 114b, a locked part 116a and the corresponding locked part 116b, and a locked part 118a and the corresponding locked part 118b are respectively set and protrude on inner walls of the casing 102 and the casing 104. In a preferred embodiment of the present invention, when the casing 102 and the casing 104 are engaged with each other, the locked part 114a and the locked part 114b are combined to form a ring-shaped locked part 114, the locked part 116a and the locked part 116b are combined to form a ring-shaped locked part 116, and the locked part 118a and the locked part 118b are combined to form several linear locked parts 118, such as illustrated in FIGS. 1a, 1b and 3.

A concave 110a and a concave 112a are respectively set in a portion of an end surface 106a and a portion of the end surface 108a of the casing 102. Additionally, a concave 110b and a concave 112b are respectively set in a portion of an end surface 106b and a portion of the end surface 108b of the casing 104. When the casing 102 and the casing 104 are engaged with each other, the concave 110a of the casing 102 and the concave 110b of the casing 104 are combined to form an opening 110, and the concave 112a of the casing 102 and the concave 112b of the casing 104 are combined to form an opening 112. The other portion of the end surface 106a of the casing 102, except for the concave 110a, and the other portion of the end surface 106b of the casing 104, except for the concave 110b, are combined to form a locked structure similar to the ring-shaped locked part 114, and similarly, the other portion of the end surface 108a of the casing 102, except for the concave 112a, and the other portion of the end surface 108b of the casing 104, except for the concave 112b, are combined to form a locked structure similar to the ring-shaped locked part 114. In a preferred embodiment of the present invention, the casing 102 and the casing 104 are engaged with each other to form a hollow tapered body, such as illustrated in FIG. 3. In the present invention, the casing 102 and the casing 104 are preferably made of a heat-resistant and hard material, such as heat-resistant plastic, metal and metal alloy.

In a preferred embodiment of the present invention, after the end portions of the optical fibers are gathered by, for example, a metal piece, an optical fiber hank 124 is formed and deposed in a chamber between the locked part 116 and the locked part 118, and the optical fiber hank 124 is embedded on the locked part 118. Another chamber between the locked part 114 and the locked part 116 in the assembling device 100 exists, and a great portion of a light source 122, such as a light-emitting diode device, can be put in the chamber, in which the indentation portion of the light source 122 can be inserted on the locked part 114. The locked parts in the inner sides of the casing 102 and the casing 104 are formed according to the shapes of the light source 122 and the optical fiber hank 124, so the light source 122 and the optical fiber hank 124 can be effectively inserted and fixed within the assembling device 100. Furthermore, because the light source 122 and the optical fiber hank 124 can be accurately fixed within the assembling device 100, the distance between the light source 122 and the optical fiber hank 124 can be exactly controlled. In addition, the casing 102 and the casing 104 are made of hard materials. Therefore, the projecting angle of the light source 122 cannot be affected by the assembling device 100, so the light emitted by the light source 122 can completely project into the optical fiber hank 124, thus enhancing the luminescence of the optical fibers.

The opening 112 in the end surface 108 of the assembling device 100 can be used as the exit of the optical fiber hank 124, and the opening 110 in the end surface 106 of the assembling device 100 can be used as the exit of the electric wire of the light source 122. The locked structure composed of the portion of the end surface 108 of the assembling device 100, except for the opening 112 can trap the gathered portion in the end portion of the optical fiber hank 124 within the assembling device 100. The locked structure composed of the portion of the end surface 106 of the assembling device 100, except for the opening 110, can trap the light source 122 within the assembling device 100. Accordingly, it can prevent the optical fiber hank 124 and the light source 122 from being detached by an external force.

Figure 2A:
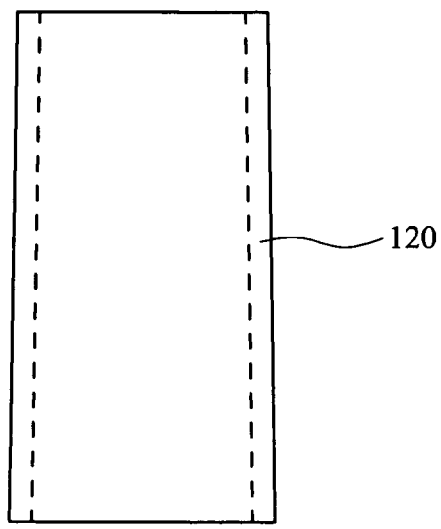
FIG. 2a is a three-dimensional schematic diagram of a fixing device in accordance with a preferred embodiment of the present invention.
Figure 2B:
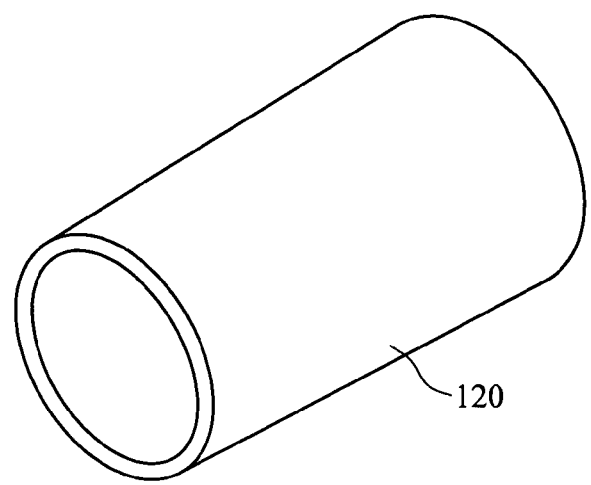
FIG. 2b is a cross-sectional view of a fixing device in accordance with a preferred embodiment of the present invention.

Referring to FIGS. 2a and 2b, FIG. 2a is a three-dimensional schematic diagram of a fixing device in accordance with a preferred embodiment of the present invention, and FIG. 2b is a cross-sectional view of the fixing device shown in FIG. 2b. Because the fixing device 120 is used to closely engage with the outer wall of the assembling device 100, the fixing device 120 is a hollow casing. In a preferred embodiment, the shape and the size of the internal hollow chamber of the fixing device are dependent on the shape and the size of the assembling device 100, i.e., the shape of the assembling device 100 is tapered, so the shape of the hollow chamber of the fixing device 120 is preferably tapered, wherein the taper angle of the assembling device 100 and the fixing device 120 are preferably the same, and the size of the hollow chamber of the fixing device 120 must be slightly larger than that of the assembling device 100. The fixing device 120, then, can be closely enclosed around the assembling device 100, such as shown in FIG. 3. The fixing device 120 can also be a hollow rectangular body, and the shape of the fixing device 120 is dependent on the assembling device 100. The fixing device 120 can have any shape that can closely contact the outer wall of the assembling device 100 to fix the assembling device 100 when the fixing device 120 is put around the assembling device 100. For example, when the assembling device 100 is a hollow tapered body, the fixing device 120 can similarly be a tapered body, or a rectangular body. In the present invention, the material of the assembling device 100 and the material of the fixing device 120 can be the same, or different, according to the actual concern of the manufacture and the design requirements. Furthermore, the colors and the materials of the assembling device 100 and the fixing device 120 can be changed according to the actual application and the design needs.

In the application of the light-guide fixing equipment of the present invention, the optical fiber hank 124 and the light source 122 are put on the casing 102 or the casing 104, and respectively inserted on the locked part 118 and the locked part 114. Then, the casing 102 and the casing 104 are inserted into each other. After the casing 102 and the casing 104 are combined, the fixing device 120 is put around the outer wall of the assembling device 100. Because the assembling device 100 and the fixing device 120 are both tapered bodies, when an external force is applied to the fixing device 120 along the outer wall of the assembling device 100, the fixing device 120 can stay close to the outer wall of the assembling device 100 to tightly lock up the assembling device 100 and further fix the assembling device 100, such as shown in FIG. 3.

The light-guide fixing equipment of the present invention can be reused; for example, when the light source 122 breaks, the fixing device 120 can be removed from the outer wall of the assembling device 100; next, the casing 102 and the casing 104 are separated; and then the light source 122 is taken out for replacement. After the replacement of the light source 122, the installation of the optical fiber illuminant device is completed by the installing method described above.

According to the aforementioned description, one advantage of the present invention is that the light-guide fixing equipment can accurately control the projecting angle of a light source to make the light emitted by the light source completely project into an illuminant device, thereby achieving the objective of effectively enhancing the luminescence of the illuminant device.

According to the aforementioned description, another advantage of the present invention is that the light-guide fixing equipment can be suitably put into the assembling device, and then the fixing device is put around and engaged with the assembling device, thus preventing the light-guide fixing equipment from being detached by an external force. Therefore, the light-guide fixing equipment has excellent fixing effect.

According to the aforementioned description, still another advantage of the present invention is that an assembling device and a fixing device with different shapes and colors can be provided according to the application needs and the shape of the light source, so the light-guide fixing equipment enables a beautiful appearance for wide variety of applications compared to the conventional heat shrinkable tubing.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A light-guide fixing equipment, suitable for assembling a light source and a hank of optical fibers of an optical fiber illuminant device, wherein the light-guide fixing equipment consists of:

an assembling device, which is constituted by inserting a first casing into a second casing, wherein the assembling device includes two openings respectively located in a portion of two end surfaces on opposite sides of the assembling device, and a plurality of locked parts are set and protrude on inner walls of the first casing and the second casing according to the shape of the light source and the hank of the optical fibers, and with the other portion of the end surfaces of the assembling device and the locked parts, the light source and the hank of the optical fibers can be assembled and fixed within the assembling device; and a fixing device, which is a monolithic hollow housing, wherein the fixing device can engage with an outer wall of the assembling device by inserting the assembling device into the fixing device, so as to fix the assembling device, wherein the light source is a light-emitting diode.

2. The light-guide fixing equipment according to claim 1, wherein the fixing device is a rectangular body.

3. The light-guide fixing equipment according to claim 1, wherein the materials of the first casing and the second casing are heat-resistant and hard materials.

4. The light-guide fixing equipment according to claim 1, wherein the materials of the first casing and the second casing are heat-resistant and hard plastics.

5. The light-guide fixing equipment according to claim 1, wherein the materials of the first casing and the second casing are selected from the group consisting of metal and metal alloy.

6. The light-guide fixing equipment according to claim 1, wherein the material of the assembling device and the material of the fixing device are the same.

7. The light-guide fixing equipment according to claim 1, wherein the material of the assembling device and the material of the fixing device are different.

8. The light-guide fixing equipment according to claim 1, wherein the first casing and the second casing are connected to form a hollow tapered body.

9. The light-guide fixing equipment according to claim 1, wherein the fixing device is a tapered body.

10. A light-guide fixing equipment, suitable for assembling a light source and a hank of optical fibers of an optical fiber illuminant device, wherein the light-guide fixing equipment consists of:

an assembling device, which is a hollow tapered body constituted by inserting a first casing into a second casing, wherein the assembling device includes two openings respectively located in a portion of two end surfaces on opposite sides of the assembling device, and with the other portion of the end surfaces of the assembling device, the light source and the hank of the optical fibers can be assembled and fixed within the assembling device; and a fixing device, which is a monolithic hollow housing, wherein the fixing device can engage with an outer wall of the assembling device by inserting the assembling device into the fixing device, so as to fix the assembling device.

11. The light-guide fixing equipment according to claim 10, wherein the fixing device is a rectangular body.

12. The light-guide fixing equipment according to claim 10, wherein a plurality of locked parts are set and protrude on inner walls of the first casing and the second casing according to the shape of the light source and the hank of the optical fibers, to fix the light source and the hank of the optical fibers.

13. The light-guide fixing equipment according to claim 10, wherein the light source is a light-emitting diode.

14. The light-guide fixing equipment according to claim 10, wherein the materials of the first casing and the second casing are heat-resistant and hard materials.

15. The light-guide fixing equipment according to claim 10, wherein the materials of the first casing and the second casing are heat-resistant and hard plastics.

16. The light-guide fixing equipment according to claim 10, wherein the materials of the first casing and the second casing are selected from the group consisting of metal and metal alloy.

17. The light-guide fixing equipment according to claim 10, wherein the material of the assembling device and the material of the fixing device are the same.

18. The light-guide fixing equipment according to claim 10, wherein the material of the assembling device and the material of the fixing device are different.

19. The light-guide fixing equipment according to claim 10, wherein the fixing device is a tapered body.

* * * * *